April 18, 1961 J. E. HURTLE ET AL 2,979,889
TEMPERATURE-MODIFIED EXHAUST NOZZLE SCHEDULING
CONTROLLER FOR A GAS TURBINE ENGINE
Filed Sept. 18, 1956 4 Sheets-Sheet 1

INVENTORS.
JAMES E. HURTLE.
JAMES M. EASTMAN.
ASA N. KITCHEN.
BY *Brodahl*
ATTORNEY.

April 18, 1961 J. E. HURTLE ET AL 2,979,889
TEMPERATURE-MODIFIED EXHAUST NOZZLE SCHEDULING
CONTROLLER FOR A GAS TURBINE ENGINE
Filed Sept. 18, 1956 4 Sheets-Sheet 3

INVENTORS
JAMES E. HURTLE
JAMES M. EASTMAN
ASA N. KITCHEN
BY *Brodahl*
ATTORNEY.

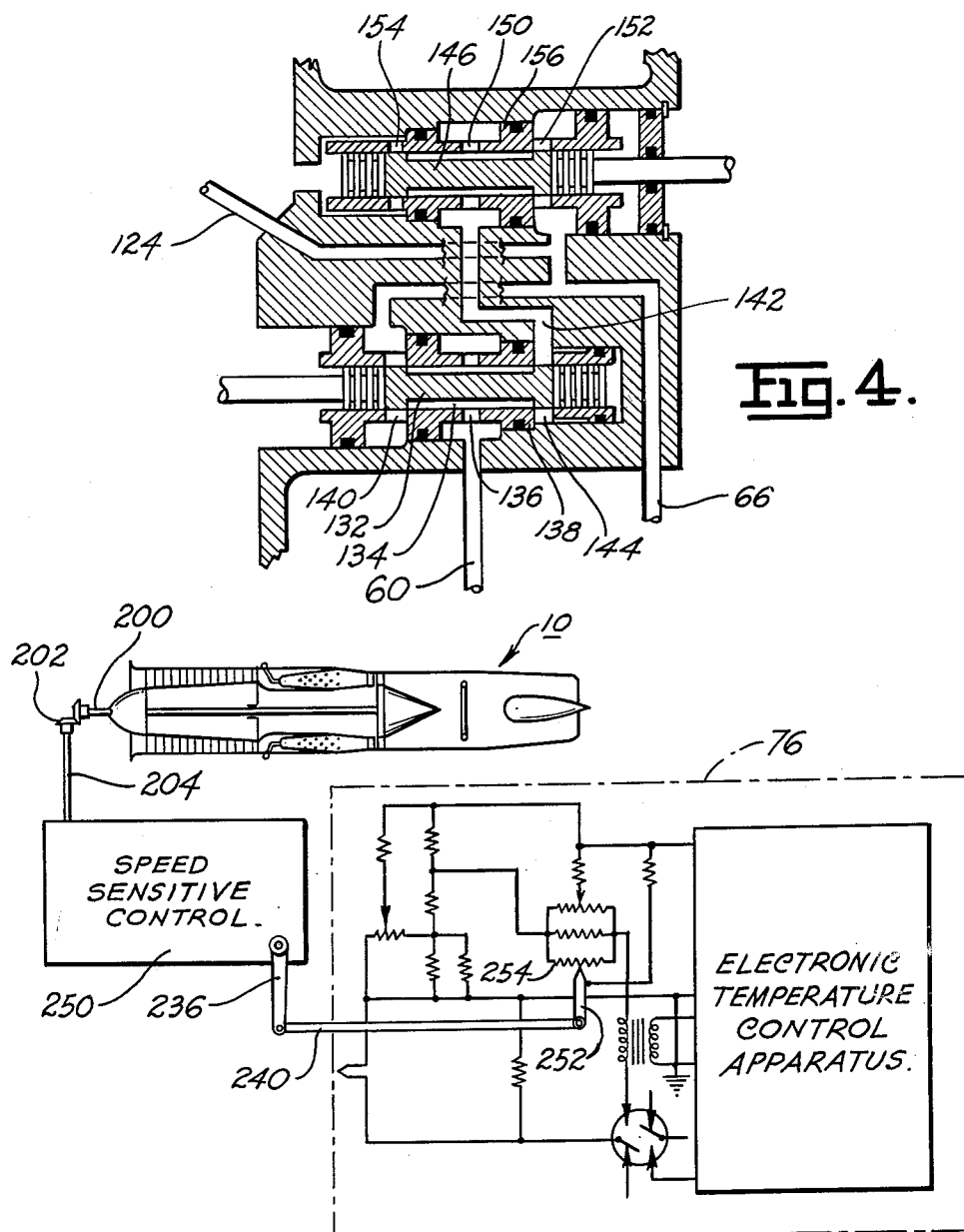

United States Patent Office 2,979,889
Patented Apr. 18, 1961

2,979,889

TEMPERATURE-MODIFIED EXHAUST NOZZLE SCHEDULING CONTROLLER FOR A GAS TURBINE ENGINE

James E. Hurtle, James Middleton Eastman, and Asa N. Kitchen, South Bend, Ind., assignors to The Bendix Corporation, a corporation of Delaware Filed Sept. 18, 1956, Ser. No. 610,611

4 Claims. (Cl. 60—35.6)

The present invention relates in general to control apparatus for an engine and more particularly to control apparatus for the exhaust nozzle area of an internal combustion engine such as a gas turbine or the like.

It is an object of the present invention to provide improved control apparatus for an engine and more particularly to provide improved control apparatus for an internal combustion engine such as a gas turbine engine.

It is another object of the present invention to provide improved control apparatus for a gas turbine engine having a variable area exhaust nozzle which control apparatus is operative to vary the area of that nozzle.

It is a different object of the present invention to provide an improved control apparatus for varying the area of a gas turbine engine exhaust nozzle, which control apparatus is operative as an integrating type of temperature control system.

It is a further object of the present invention to provide improved control apparatus for the exhaust nozzle area of an engine which apparatus is more simple and reliable and accurate in operation and controls the nozzle area relative to a reference or scheduled engine operating temperature and an actual engine operating temperature.

It is an additional object of the present invention to provide an improved control apparatus for the exhaust nozzle of the gas turbine engine which apparatus is responsive to a scheduling input signal and an actual nozzle area feedback signal to determine the nozzle area relative to the operation of the engine.

It is still another object of the present invention to provide improved control apparatus for the exhaust nozzle of an engine which apparatus is responsive to the actual operation of that engine as may be sensed by the turbine operating temperature, as well as a desired or scheduled operation of that engine as may be scheduled or determined by the speed of the engine or by a manually controlled throttle member or the like.

It is a still different object of the present invention to provide an improved gas turbine exhaust nozzle area control apparatus which is responsive to the actual operation of the engine and to a scheduled engine operation to control the nozzle area.

It is a still further object of the present invention to provide an improved control apparatus for a combustion type of engine having a variable engine controlling fluid area, and which control apparatus is, operative during both normal and emergency operation of the engine for controlling said engine operation.

These and other objects and advantages of the present invention will become apparent in view of the following description taken in conjunction with the drawings wherein:

Figure 4 shows a modification of the control apparatus as shown in Figure 2; and Figure 5 shows a modification of the electronic temperature control shown in Figure 2 to provide a variable reference as a function of a predetermined engine operating parameter for the control of the exhaust nozzle area.

Figure 1:
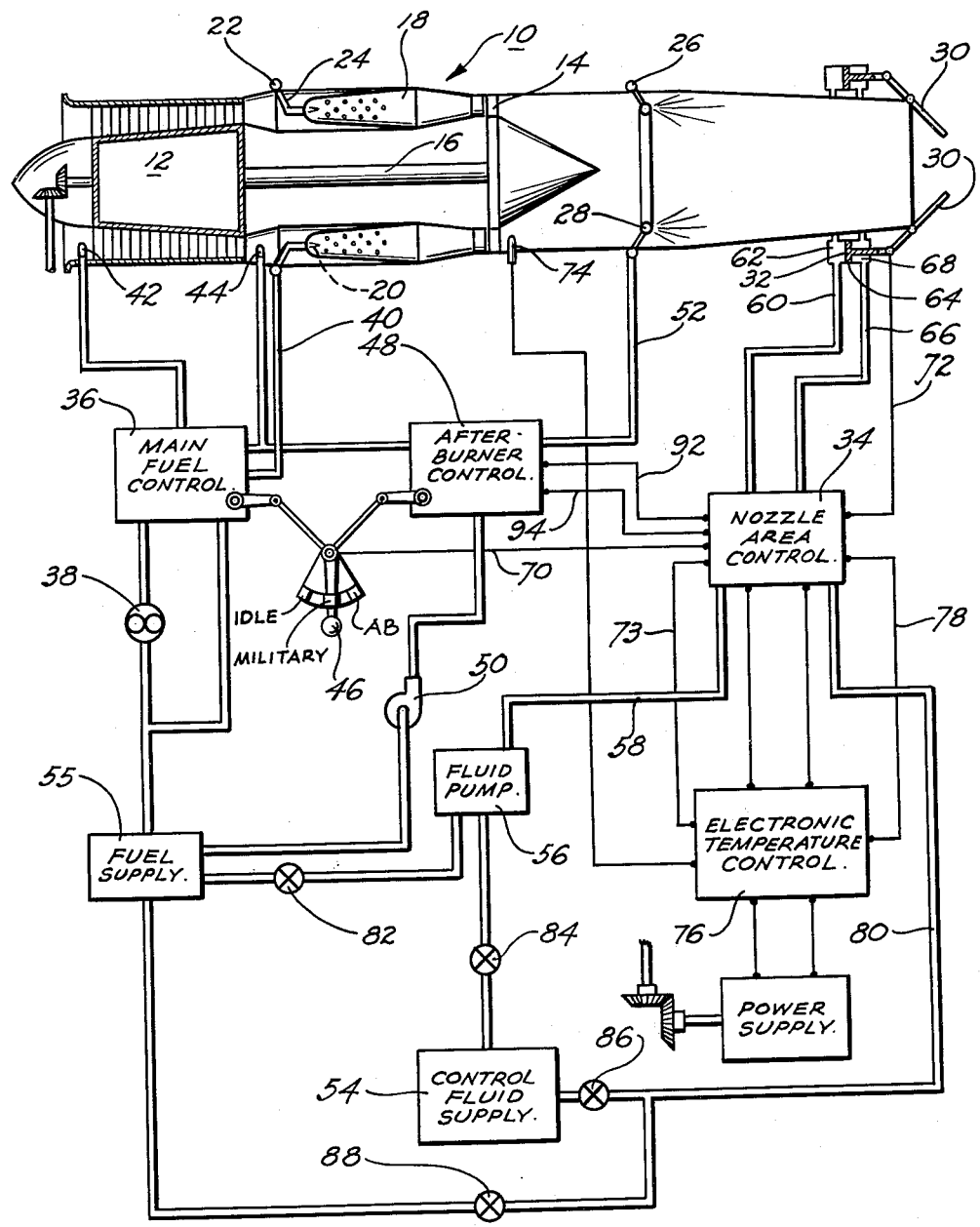
Figure 1 shows a gas turbine engine, and control apparatus for that engine in accordance with the present invention.

In Figure 1 there is shown a gas turbine engine 10 including a compressor 12, a turbine 14 and a drive shaft 16 connected between said compressor and said turbine. A plurality of combustion chambers 18 are provided, with each combustion chamber 18 including a fuel nozzle 20 supplied fuel from a common fuel manifold 22 through individual fuel lines 24. The engine includes an afterburner manifold 26 which supplies fuel to an afterburner unit 28 located in the tailpipe of the engine 10 downstream from the turbine 14. Exhaust nozzle area control gates 30 are provided for varying the area of the exhaust nozzle, with the control gates 30 being adjustable in position by a plurality of control pistons 32 which are controlled in position in turn by a nozzle area control 34.

A main fuel control 36 is provided for controlling the supply of fuel from the main fuel pump 38 through the outlet conduit 40 to the main fuel manifold 22. The operation of the main fuel control 26 may be determined by the inlet or ram pressure to the engine as sensed by an inlet pressure responsive device 42 and/or by the compressor discharge pressure as sensed by a pressure responsive device 44, and by the position of a control throttle member 46. An afterburner fuel control 48 is provided for controlling the supply of fuel from the afterburner fuel pump 50 through an outlet conduit 52 to the afterburner fuel manifold 26. The afterburner fuel control may be responsive to the discharge pressure of the compressor 12 as sensed by the pressure responsive device 44 and the position of the control throttle member 46.

The nozzle area control 34 is operative to control the supply of a control fluid from a control fluid supply 54 through a fluid pump 56 and an outlet conduit 58, with the nozzle area control 34 being operable to control the flow of control fluid between a conduit 60 connected to a first end 62 of a control piston cylinder 64 and a conduit 66 connected to a second end 68 of the cylinder 64. The nozzle area control 34 is responsive to the position of the control throttle member 46 through a connection 70, and is responsive to the position of the area control gate 30 through a feedback connection 72, and is responsive to an actual engine operating temperature, for example, turbine outlet or inlet temperature as sensed by a temperature responsive device 74 operating through an electronic temperature control 76 and through a temperature control connection 78 to the nozzle area control 34. A control fluid return conduit 80 is connected between the nozzle area control 34 and the control fluid supply 54.

Control valves 82, 84, 86 and 88 are provided in the event that it becomes desirable to utilize engine fuel rather than a separate control fluid for the operation of the exhaust nozzle area control gates 30. Control valves 82 and 88 are closed if control fluid is to be used and control valves 84 and 86 are closed if engine fuel is to be used. A pair of connections 92 and 94 are provided from the nozzle area control 34 to the afterburner control 48 for the control of the afterburner control 48 as may be desired and as later described.

It should be here noted that the electronic temperature control 76 may be in accordance with the teachings of copending application Serial No. 560,670 filed January 23, 1956 by N. K. Peters and D. A. Reynick, and assigned to the same assignee as the present application.

Figure 2:
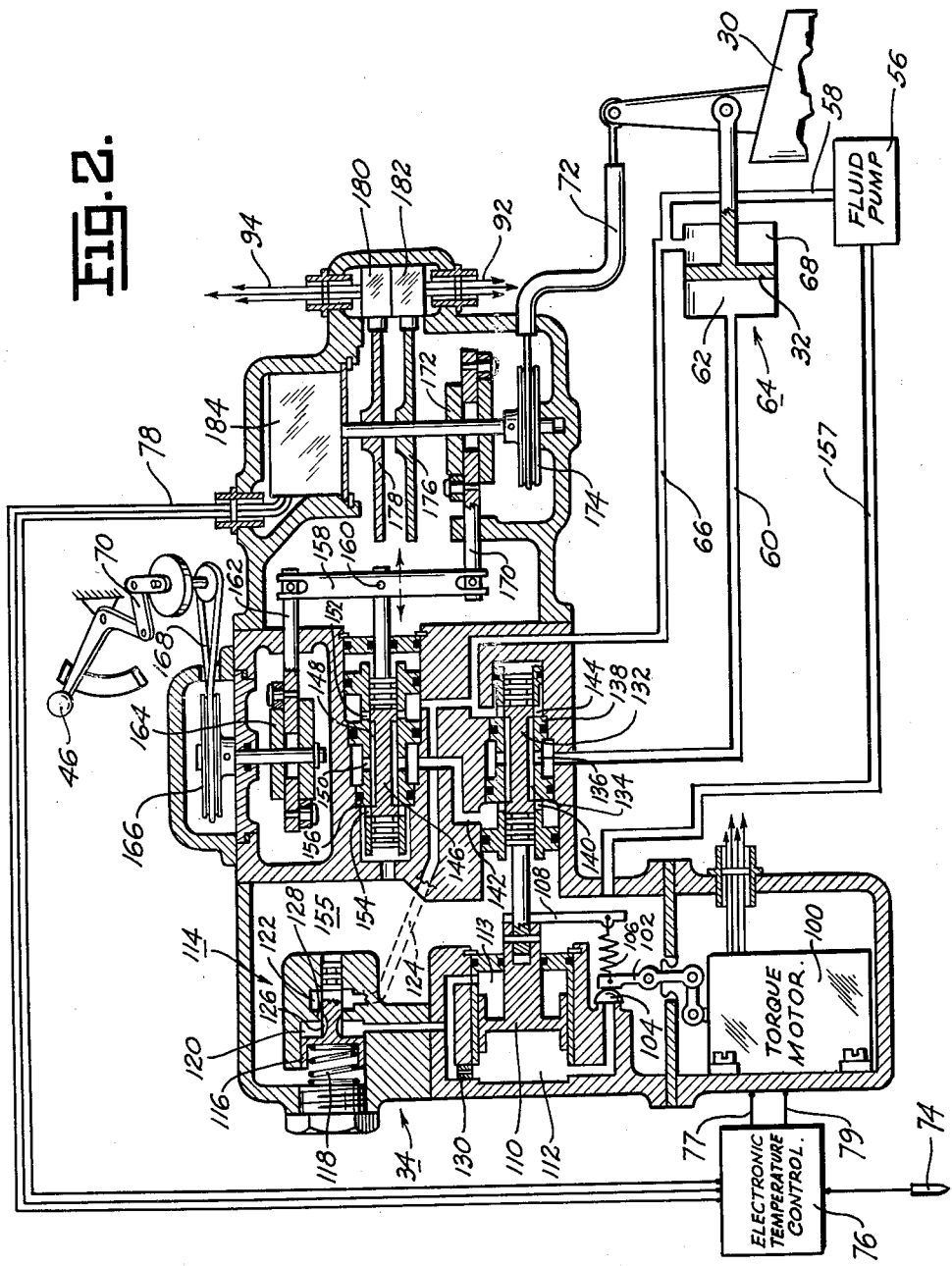
Figure 2 is a cross sectional view of the nozzle area control shown in Figure 1.

Referring to Figure 2 there is shown a cross sectional schematic view of the nozzle area control 34 as shown in Figure 1. In Figure 2 there is shown the electronic temperature control 76 which is supplied with an engine operating temperature signal as sensed by the temperature sensitive element 74. The output of the temperature control 76 is supplied through a pair of conductors 77 and 79 to a torque motor 100 within the nozzle area control 34. The output of the torque motor 100 is applied to a control lever 102 to open or close a half-ball or servo pilot valve 104. A control spring member 106 is connected between the control lever 102 and a support arm 108 connected to move with a control piston 110 as determined by servo control fluid within a fluid chamber 112. In this respect, movement of the support arm 108 with the control piston 110 effectively loads the spring member 106 to counteract the input force applied by the torque motor 100 to the control lever 102.

A servo pressure regulator valve 114 includes a control piston 116 movable relative to a compression spring member 118 in response to control fluid at servo regulated pressure within the fluid chamber 120. High pressure control fluid is supplied to the fluid chamber 122 through a conduit 124 from a conduit 66 and a conduit 58 from the control fluid pump 56. The control piston 116 includes tapered control fluid passages or openings 126 which operate relative to sleeve member portions 128 of the regulator 114 such that the flow of control fluid from the fluid chamber 122 to the fluid chamber 120 is controlled by the compression spring 118 such that the force of the control fluid at the regulated pressure within the fluid chamber 120 acting against the piston member 116 and said compression spring 118 is effective to regulate the pressure of the control fluid within the chamber 120. This control fluid is supplied through control bleed member 130 to the fluid chamber 112, such that the opening or closing of the half-ball 104 by the control lever 102 effectively determines the fluid pressure within the chamber 112 and thereby positions the piston member 110 against the action of control fluid at servo regulated pressure within chamber 113. A movable first valve member 132 is connected to be operative with or positioned by the control piston 110. The valve member 132 includes an annular recess 134 which is operative with ports 136 in a sleeve member 138 such that should the control fluid pressure within the fluid chamber 112 decrease the piston member would move from its null or central position as shown in Figure 2 to the left and the annular recess 134 of the valve member 132 would allow control fluid to flow from the conduit 60 and the end chamber 62 through the port 136, the annular recess 134 and the port 140 of the conduit 142. On the other hand should the fluid pressure within the chamber 112 increase, the piston member 110 would move from its null position as shown in Figure 2 to the right and a control fluid path would be provided to the conduit 60 through the port 136, the annular recess 134 and the port 144 from the conduit 66.

One of the electrical connections, for example 92, may be connected to a solenoid controlled valve in the afterburner fuel supply line to prevent afterburner fuel to be supplied to the engine until after the exhaust nozzle area is closed to a predetermined position. The other connection 94 may be used to shut off the hot streak ignition system after the afterburner is fired to cause the nozzle area to open.

A second valve member 146 is provided including an annular recess 148 operative with ports 150, 152 and 154 of a sleeve member 156. The second valve member 146 is connected to a control lever 158 at pivot connection 160. A first end of the control lever 158 is operatively connected to a cam follower 162 operative with a first control cam member 164 which is positioned by a control pulley member 166. As shown in Figures 1 and 2 the pulley member 166 is connected through a positive drive flexible cable member 168 and a linkage connection 70 to the pilot's manual control throttle member 46. The second end of the control lever 158 is connected to a second cam follower 170 which is operative with a second cam 172 that is positioned by a second control pulley 174 and by the feedback connection 72 from the nozzle area control gate or shroud 30. The feedback connection 72 may be in the form of a positive drive and flexible cable member if desired. A pair of control cam members 176 and 178 are connected for rotation with the feedback second control cam 172 and are operative to control afterburner control switches 180 and 182. The latter control switches are connected through electrical connections 94 and 92 respectively, which are shown in Figure 1, to the afterburner control 48 for controlling the operation of the afterburner unit of the engine 10. An area rate feedback potentiometer 184 is connected for operation with the feedback cam 172 and provides through electrical connection 78 and area rate damping signal to the electronic temperature control 76.

The nozzle control piston 32 is shown connected to the nozzle area control gate 30 and is responsive to high pressure control fluid applied by the pump 56 through the conduit 58 to the fluid chamber 68, and to the control fluid supplied to the chamber 62 through the conduit 60 from the nozzle area control 34 and the conduit 66. It should be noted that the area of the control piston 32 as exposed to the control fluid within the fluid chamber 62 is greater than the area of the control piston 32 exposed to the control fluid within the fluid chamber 68.

Figure 3:
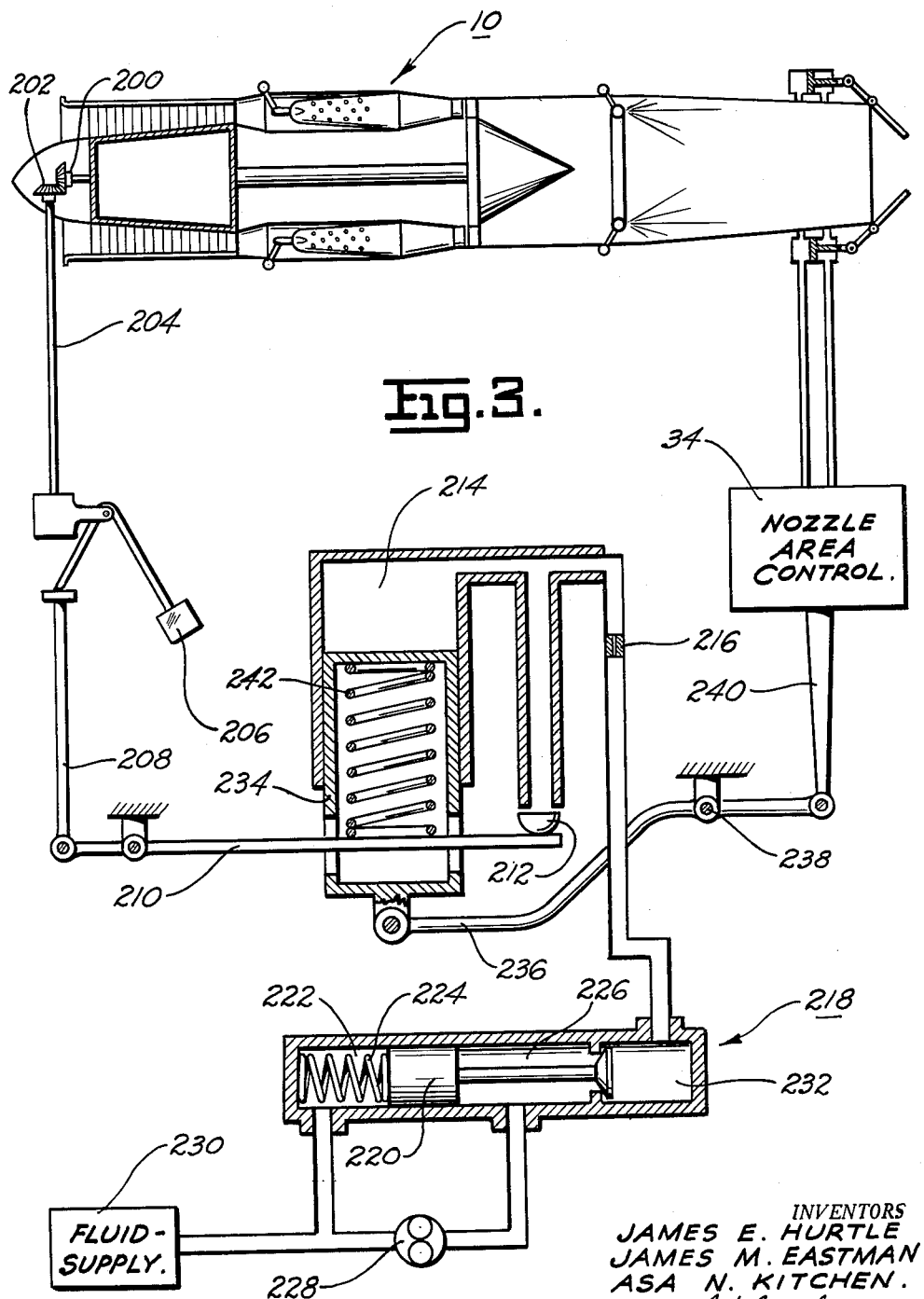
Figure 3 shows a gas turbine engine, and a modified control apparatus for that engine in accordance with the present invention.

In Figure 3 there is shown a modification of the control apparatus in accordance with present invention. In Figure 3 like components as compared to the showing of Figure 1 have been given similar identifying numerals. In Figure 3 there is shown a control shaft 200 connected for rotation with the compressor, turbine and drive shaft of the gas turbine engine 10. The control shaft 200 is connected through a set of bevel gears 202 to a second control shaft 204 which is operative to support and rotate a speed responsive flyweight 206. The output force of the flyweight is applied through a control arm 208 and a control link member 210 to position a servo half-ball 212. The half-ball 212 is operative to control the servo fluid pressure within the servo fluid chamber 214, which servo control fluid is supplied through a control bleed 216 from a conventional servo pressure regulator 218. The latter servo regulator includes a control piston 220 which is responsive to pump inlet pressure within the fluid chamber 222 and the output force of a compression spring member 224 acting against the pump outlet pressure within the fluid chamber 222 and the output force of a compression spring member 224 acting against the pump outlet pressure within the fluid chamber 226 from the fluid pump 228 operating with the control fluid supply 230. The latter control fluid supply 230 may correspond to the control fluid supply 54 or the fuel supply 55 as shown in Figure 1, if desired. The regulated pressure servo control fluid within the chamber 232 is supplied through the control bleed 216 to the fluid chamber 214. A control piston member 234 is responsive to the servo fluid pressure within the chamber 214 and in turn is connected through a control lever 236 which is pivoted about fixed pivot 238 to position a control arm 240. The control arm 240 may be connected to the first control pulley 166 as shown in Figure 2 if desired for positioning the cam member 164 as a function of engine speed. A compression spring member 242 is operative between the control piston 234 and the control lever 210 as shown in Figure 3.

In Figure 4 there is shown a modification of the control apparatus shown in Figure 2, and like identifying numerals have been given to similar components. In Figure 4, the fluid conduit 66 is connected to port 140 of the first valve member 132, and the fluid conduit 142 is connected between the port 144 of the first valve member 132 and the port 150 of the second valve member 146. The rest of the nozzle area control apparatus is substantially the same.

In Figure 5 there is shown a modification of the control apparatus including the electronic temperature control 76, wherein the speed sensitive control 250 may correspond to the speed responsive control apparatus shown in Figure 3, with the output shaft or lever 236 and the control arm being connected to position the variable contact member 252 of the potentiometer 254 for varying the reference temperature setting of the electronic temperature control 76 as a function of engine speed. The remaining portion of the electronic temperature control 76 may be in accordance with the teachings of the previously referred to copending application Serial No. 560,670 and filed January 23, 1956.

In the operation of the control apparatus in accordance with the present invention and as shown in Figures 1 and 2 the control apparatus is operative as an integrating temperature system such that the first control valve 132 is positioned proportional to the temperature error or difference between the reference temperature established in the electronic temperature control 76 and the actual engine operating temperature as sensed by the temperature responsive device 74. The rate of travel or velocity of the exhaust area control pistons 32 (only one of which is shown in Figure 2) is proportional to this same temperature error, and even a small fluid flow opening of the first control valve 132 will cause the area control pistons 132 to travel the full extent allowed by the piston cylinders 64.

Assume that an overtemperature error condition is present (the exhaust gas temperature is greater than the reference tempreature setting within the electronic temperature control 76), this causes the torque motor 100 to close the half-ball 104 shown in Figure 2 to move the first control valve 132 to the right until the spring member 106 is loaded as necessary to balance the input lever system including the control lever 102, and the half-ball 104 is thereby placed in its null or neutral position to hold the control piston 110 in a position proportional to the temperature error. The first control valve 132 then ports the high pressure fluid conduit 66 to the conduit 60 and end chamber 62 to cause the area control piston 32 to move to the right and move the gate 30 to open the exhaust area at a rate or velocity proportional to the overtemperature error.

As the exhaust area increases by opening the gate 30, the feedback connection 72 rotates the feedback or second cam member 172 to act through the cam follower member 170 for moving the second valve member 146 to the left such than conduit 142 is connected through annular recess 148 to port 154 and control fluid exhaust chamber 155. This allows the integrating engine temperature control system in accordance with the present invention to have control of all exhaust nozzle areas greater than those scheduled by the first cam member 164 and the second cam member 172. In other words, the first cam 164 and the feedback or second cam 172 acting together schedule the exhaust nozzle area, and the second control valve 146 is operative with these cam members to control the position of the exhaust nozzle gates 30 to provide the so scheduled area. The temperature control system, including the control piston 110 and the first control valve 132, is operative to override the so scheduled exhaust nozzle area whenever the engine operating temperature, as may be sensed by the turbine exhaust gas temperature, relative to the predetermined reference temperature of the electronic temperature control 76 is such as to require an exhaust nozzle area greater than the so scheduled nozzle area.

If the scheduled nozzle area provides an engine exhaust gas temperature as sensed by the temperature responsive device 74 which is below or less than the reference temperature established for the electronic temperature control 76, then the temperature control system including the first valve member 132 will not be operative to increase the nozzle area. It is only when the scheduled nozzle area produces an engine exhaust gas temperature greater than the above-said established reference temperature that the temperature control system including the first valve member 132 is operative to control the exhaust nozzle area. In this respect, it is desirable that the nozzle area be controlled such that the turbine exhaust gas temperature be maintained substantially the same as the established reference temperature when the temperature control system is controlling the nozzle area.

Any overshoot or movement of the control gate 30 in an opening direction, which is greater than necessary to bring the temperature error to zero, is corrected through the action of the exhaust nozzle area to decrease the actual engine operating temperature below the scheduled temperature such that the temperature responsive device 74 acting through the torque motor 100 opens the half-ball 104 and the control piston 110 and first control valve member 132 and moved to the left to provide a discharge path for the control fluid within the fluid chamber 62 through the conduit 60, the port 136, the annular recess 134 and the port 140 to the fluid conduit 142 now connected to the pump inlet pressure fluid chamber 155. This effectively exhausts a portion of the control fluid from the fluid chamber 62 such that the nozzle area control gate 30 begins to close as required to assume the necessary position to balance out or bring to zero the temperature error between the actual engine operating temperature and the scheduled temperature.

With the form of the control apparatus as shown in Figures 1 and 2 if the throttle 46 is moved by the engine operator to request a closure or decrease in the exhaust nozzle area, prior to the established reference temperature of the control 76 requesting such a change relative to the actual engine operating temperature, the second control valve 146 is moved to the left to connect the conduit 142 to the pump inlet pressure or fluid exhaust chamber 155. In addition since the actual engine operating temperature is for the latter assumed engine operation less than the reference temperature of the electronic control 76, the first control valve 132 is positioned to the left, with the nozzle area control 34 as shown in Figure 2, such that a path is provided from the conduit 142 through the port 140 to the annular recess 134 of the first control valve 132 and the port 136 to the conduit 60 and the fluid chamber 62, so the nozzle control piston 32 is moved to the left and the exhaust nozzle area is decreased. Then the feedback cam 172 in response to the feedback control pulley 174 and the feedback connection 72 will reposition the second control valve member 146 to null out the latter control operation introduced by repositioning the throttle control member 46.

On the other hand if the throttle control member 46 is repositioned such as to request a lower engine thrust or lower engine speed the nozzle area will increase or open as scheduled by the first control cam 164 acting in conjunction with the feedback control cam 172 in accordance with the previous operational description.

Referring to the apparatus shown in Figure 3, there is shown an engine speed sense input control applied to the nozzle area control 34 wherein the scheduled area is selected as a function of engine speed. As shown in Figure 3 the control arm 240 is positioned as a function of engine speed, such that the input control cam 164 as shown in Figure 2 is positioned as a function of engine speed. For example, as the engine speed increases the cam 164 rotates to postion the second control valve 146 to the left and connects conduit 142 to the exhaust fluid chamber 155. Under these conditions the engine exhaust gas temperature will be below the reference temperature of the electronic control 76. Thusly, an undertemperature error signal will cause the torque motor 100 to open the half-ball valve 104 and move the first control valve 132 to the left. This connects the conduit 60 to the exhaust chamber 155 and causes the shroud 30 to close the exhaust nozzle area. As the area so closes, the feedback connection 72 positions the cam 172 to move the second control valve 146 to the right for maintaining the nozzle area as scheduled by engine speed through the input control cam 164.

In Figure 2 the first control valve member 132 and the second control valve member 146 are shown in their null or intermediate positions, which would occur only when engine operating temperature was substantially the same as the reference temperature to result in positioning the first control valve 132 in its null position, and the engine operating conditions or parameters, such as flight speed, inlet temperature and the like, were such as to provide an exhaust gas temperature for the scheduled area position that is substantially the same as said reference temperature to result in positioning the second control valve 146 in its null position. For actual engine operating temperatures above the latter reference temperature the half-ball 104 would be closed and the first control valve member 132 would be positioned to the right to allow high pressure control fluid to enter the fluid chamber 62 resulting in an increase in the exhaust nozzle area. As the area so increases, the second control valve member 146 is positioned by the feedback control cam 172 to the left such that the exhaust port 140 of the first control member 132 and the conduit 142 are ported to the exhaust fluid chamber 155. Then the integrating temperature system has complete control of the exhaust nozzle area for engine operating temperatures above the established reference temperature of the electronic control 76. For engine operating temperatures below the established reference temperature of the control 76, the first control valve member 132 is positioned to connect the conduit 60 through the port 136, the annular recess 134 and the port 140 to the conduit 142. If the actual nozzle area is greater than the scheduled area, then the second control valve 146 will be positioned to the left and will connect conduit 142 to the exhaust fluid chamber 155. The nozzle area will then close until the reference temperature is reached such that the temperature error signal becomes zero or until the scheduled area is reached. In the latter case the nozzle area may be controlled by the second control valve member 146, and the cam schedule then has control of the exhaust nozzle area.

A rotational potentiometer 184 may be provided to supply an area rate feedback signal to the electronic temperature control 76 to aid stability by minimizing the effects of hysteresis in the movement of the exhaust nozzle control gate 30.

In the event of failure of the power source for the electronic temperature control 76, the torque motor 100 will fail to a position to open the half-ball 104 and give control of the exhaust nozzle area to the cam schedule and the second control valve member 146.

The particular form of the control fluid servo pressure regulator 114 shown in Figure 2 has the advantage of having the regulating area which is exposed to the high pressure control fluid within the fluid chamber 122 being very small. This allows a low leakage value from the high pressure control chamber 122 which may contain control fluid at pressures in the order of 3,000 pounds per square inch to the regulated fluid chamber 120, to permit adequate regulation at low flows of the control fluid. Also, a large piston area senses the regulated pressure within the fluid chamber 120 and is balanced by the high spring load from the compression spring 118 such that ample force is provided to move the sliding parts through any contaminants in the control fluid. Further, the metering ports as determined by the slots 126 are contoured so that a large area is exposed to control fluid flow if the regulator should become dirt clogged which increases the insensitivity to dirt. Further a large port area is exposed with low oil temperatures to minimize the effects of oil viscosity.

The modified control apparatus shown in Figure 4 is operative such that for engine operating temperatures greater than the established reference temperature of the electronic control 76, the torque motor 100 is operative to open the half-ball 104 which moves the first control valve 132 to the left and provides a flow path for high pressure control fluid from the conduit 66 to the conduit 60 and the fluid chamber 62. This may have an advantage for operation of the control apparatus with low ambient temperatures and with cold-day operation, since engine overtemperatures now open the half-ball 104, and this half-ball 104 can handle a greater control fluid flow than can the bleed 130, such that a safer control apparatus for use with low temperature fluid may be thereby provided.

The modified electronic temperature control 76 as shown in Figure 5 allows the reference temperature to be established as a function of engine speed. It should also be understood that the reference temperature may instead be established as a function of the position of the throttle member 46 if desired, since due to the operation of the conventional main fuel control as well known to persons skilled in this art the engine speed is varied relative to throttle angle or position, so engine speed and throttle position are closely related.

It should be here noted that the nozzle area may be scheduled as a function of engine speed, as shown in Figure 3, and at the same time the reference temperature may be scheduled or established as a function of engine speed, as shown in Figure 5, if desired.

For the purpose of example, the engine operation by the control apparatus in accordance with the present invention may be as follows. The engine is normally started with the nozzle area relatively open. As the engine speed is increased, the nozzle area is decreased in order to increase the available thrust from the engine. A practical engine operation schedule is one which provides the maximum safe engine operating exhaust gas temperature for a cold ambient temperature, such as a negative 65° Fahrenheit day. For any higher ambient temperature condition, this schedule would create an exhaust gas over temperature condition, as sensed by the temperature responsive device 74 at the turbine outlet or the turbine inlet or at some other location within the engine as may be desired. However, the temperature control system including the first control valve member 132 is operative to limit the engine exhaust gas temperature at a value substantially the same as the established reference temperature or the safe operational temperature as established within the electronic control 76 corresponding to the above negative 65° Fahrenheit ambient temperature. Thus, for a warmer ambient temperature than the established reference temperature, the nozzle area would be opened or increased to decrease the exhaust gas temperature to a value substantially the same as the established reference temperature. Further, even for an ambient temperature in the order of a negative 65° Fahrenheit, the temperature control system including the first control valve 132 may control the nozzle area and hence the engine exhaust gas temperature if the propulsion speed of the engine is such that due to the inlet ram effect the inlet gases to the engine have an elevated temperature such that the established reference temperature in the electronic control 76 is exceeded.

The apparatus of Figure 5 will permit the second control valve 146 to be used as an emergency control responsive to speed or throttle position as may be desired, and with the first control valve 132 being used to control the nozzle area in response to engine speed as shown in Figure 5, or if desired in response to throttle position.

For part throttle operation of the engine where increased efficiency or better specific fuel consumption is desired for the engine, it may be desirable to provide or establish a different reference temperature for the electronic control 76 corresponding to the different speeds of the engine. This will allow a part throttle or reduced thrust engine operation at an increased efficiency and hence give an increased range to an aircraft for example for a given amount of fuel. Instead of using engine speed to control the nozzle area, the throttle position or angle may be used to control the nozzle area.

It is also within the scope of the present invention to use throttle position to control the cam schedule and to establish the reference temperature, or to use engine speed to control both of these, or to use throttle position to control one of these and engine speed to control the other.

Although the present invention has been described with a certain degree of particularity, it should be understood that the present disclosure has been made only by way of example and that numerous changes in the details of construction and the combination and arrangement of parts may be resorted to without departing from the scope or spirit of the present invention.

We claim:

1. In a control system for an engine having a variable area exhaust nozzle and a source of control fluid, the combination of an engine control member having a variable position, a nozzle control device responsive in position to a fluid pressure for varying said exhaust nozzle area, conduit means connected between said source of control fluid and said nozzle control device for supplying a fluid pressure to said nozzle control device, a temperature responsive device responsive to an operating temperature of said engine, and first and second control valve members in said conduit means and operative to vary the pressure of fluid transmitted to said nozzle control device, one of said first and second control valve members having a first fluid controlling port in parallel and a second fluid controlling port in series with the other of said first and second control valve members, said first control valve member being operably connected to said temperature responsive device for controlling the pressure of the fluid to said control device as a function of said operating temperature, said second control valve member being operatively connected to said engine control member for controlling the pressure of fluid to said control device as a function of the position of said engine control member.

2. In control apparatus for an engine including a variable area exhaust nozzle and a source of control fluid, the combination of an engine control member being variable in position, a nozzle control device responsive in position to a fluid pressure and operative with said exhaust nozzle to vary the area of said exhaust nozzle, conduit means connected between said source of control fluid and said nozzle control device for supplying a fluid pressure to said nozzle control device, a nozzle area feedback device responsive to the area of said exhaust nozzle, a temperature responsive device responsive to an operating temperature of said engine, a first control valve member operatively connected to said temperature responsive means and said conduit means for controlling the fluid pressure contained therein as a function of said engine operating temperature, and a second control valve member operatively connected to said engine control member and to said feedback device, said second control valve member further connected to said conduit means for varying the fluid pressure therein as a function of the position of said engine control member and as a function of the area of said exhaust nozzle, said first control valve member including a pair of fluid controlling ports one of which is in parallel and the other in series flow relationship with said second control valve member.

3. In a control system for an engine having a source of control fluid and a variable area exhaust nozzle, the combination of engine speed responsive means responsive to the operating speed of said engine, a nozzle control device responsive in position to a fluid pressure for varying said exhaust nozzle area, conduit means connected between said source of control fluid and said nozzle control device for supplying a fluid pressure to said nozzle control device, a temperature responsive device responsive to an operating temperature of said engine, a first control valve operatively connected to said engine speed responsive means and said conduit means for varying the fluid pressure therein as a function of said engine operating speed, and a second control valve operatively connected to said temperature responsive device and said conduit means for varying the fluid pressure therein as a function of said engine operating temperature, said second control valve including first and second fluid pressure controlling orifices arranged in series and parallel flow relationship respectively with said first control valve.

4. A control apparatus for an engine including a variable area exhaust nozzle and a source of control fluid, the combination of an engine speed responsive member responsive to the operating speed of said engine, a nozzle control device responsive in position to a fluid pressure for varying said area exhaust nozzle, conduit means connected between said source of control fluid and said nozzle control device for supplying a fluid pressure to said nozzle control device, a nozzle area feedback device responsive to the area of said exhaust nozzle, a temperature responsive device responsive to an operating temperature of said engine, a first control valve operatively connected to said temperature responsive device and said conduit means for controlling the fluid pressure therein as a function of said engine operating temperature, and the second control valve operatively connected to said speed responsive member and to said feedback device, said second control valve being further connected to said conduit means for controlling the fluid pressure as a function of said engine operating speed and the area of said exhaust nozzle, said first control valve having a first fluid pressure controlling port in parallel flow relationship with said second control valve member and a second fluid pressure controlling port in series flow relationship with said second control valve.

References Cited in the file of this patent

UNITED STATES PATENTS

| | | |
|---|---|---|
| 2,566,961 | Poole | Sept. 4, 1951 |
| 2,706,383 | Jacobson | Apr. 19, 1955 |
| 2,706,886 | Michel | Apr. 26, 1955 |
| 2,734,340 | Wood | Feb. 14, 1956 |
| 2,750,734 | Anxionnaz et al. | June 19, 1956 |
| 2,820,340 | Dolza et al. | Jan. 29, 1958 |

FOREIGN PATENTS

| | | |
|---|---|---|
| 612,163 | France | July 26, 1926 |
| 1,044,666 | France | Nov. 19, 1953 |
| 1,061,753 | France | Dec. 2, 1953 |
| 750,472 | Great Britain | June 13, 1956 |